United States Patent
Rutz et al.

[11] Patent Number: 6,042,762
[45] Date of Patent: Mar. 28, 2000

[54] METHOD AND APPARATUS FOR THE CONTINUOUS WITHDRAWAL OF A MELT FILM FROM AN EXTRUSION NOZZLE

[75] Inventors: Andreas Rutz, Lindau; Adolf Mueller, Weissensberg, both of Germany

[73] Assignee: Lindauer Dornier Gesellschaft mbH, Lindau, Germany

[21] Appl. No.: 09/033,392

[22] Filed: Mar. 2, 1998

[30] Foreign Application Priority Data

Mar. 5, 1997 [DE] Germany .......................... 197 08 886

[51] Int. Cl.[7] .......................... B29C 47/14; B23Q 15/00
[52] U.S. Cl. .................................. 264/40.7; 264/211.12; 264/177.17; 264/148; 264/145; 264/40.1; 226/24; 425/135; 425/142
[58] Field of Search .......................... 425/135, 136, 425/142, 145, 436, 224; 226/24; 264/37.32, 138, 145, 173.1, 177.17, 211.12, 148, 40.1, 40.7

[56] References Cited

U.S. PATENT DOCUMENTS

| | | | |
|---|---|---|---|
| 4,173,611 | 11/1979 | Benson et al. | 264/138 |
| 4,472,864 | 9/1984 | Cunningham et al. | 26/89 |
| 4,491,309 | 1/1985 | Beckley | 270/20.1 |
| 4,609,336 | 9/1986 | Stevenson et al. | |
| 4,911,874 | 3/1990 | Peiffer et al. | |
| 5,372,290 | 12/1994 | Marmin | |
| 5,511,712 | 4/1996 | Holm et al. | |

FOREIGN PATENT DOCUMENTS

| | | |
|---|---|---|
| 0575786 | 12/1993 | European Pat. Off. . |
| 0654433 | 5/1995 | European Pat. Off. . |
| 3635302 | 4/1988 | Germany . |
| 3907036 | 9/1990 | Germany . |
| 4113746 | 4/1992 | Germany . |

Primary Examiner—Jan H. Silbaugh
Assistant Examiner—Mark Eashoo
Attorney, Agent, or Firm—W. F. Fasse; W. G. Fasse

[57] ABSTRACT

In the production of thin film that is extruded onto a cooling roller and then fed through a further treatment station such as stretching roller station, it may become necessary to stop the extrusion if a fault is present in the further treatment station. In order to avoid stopping the extrusion, a detour station with a roller set is positioned between the extrusion station and the further treatment station for detouring extruded film in response to a detected fault in any system component, except the extruder, whereby the extrusion can continue while the film is supplied to some other use while its supply to the further treatment station is interrupted. The detouring roller set includes at least one guide roller and a press-on roller that is automatically movable, for example by a piston cylinder device into a working position in response to a fault signal. When the fault signal is no longer present, the press-on roller is moved into a rest position for a continued supply of the extruded film into the further treatment station.

17 Claims, 4 Drawing Sheets

METHOD AND APPARATUS FOR THE CONTINUOUS WITHDRAWAL OF A MELT FILM FROM AN EXTRUSION NOZZLE

PRIORITY CLAIM

This application is based on and claims the priority under 35U.S.C. §119 of German Patent Application 197 08 886.4, filed on Mar. 5, 1997. The entire disclosure of German Patent Application 197 08 886.4 is incorporated herein by reference.

FIELD OF THE INVENTION

The invention relates to a method and an apparatus for the continuous production of synthetic thin film or sheets withdrawn from a melt through an extrusion nozzle or sheet die. The extrusion shall not be interrupted even if a specific or defined fault occurs in the production process of the film as long as the extrusion itself works properly.

BACKGROUND INFORMATION

In the production of film or sheet made of a melt of thermoplastic material it is important that the operation of all components of the system operate as much as possible free of faults. Particularly the extrusion section of the system should work independently of system faults outside the extrusion station because stopping the extrusion due to faults in other stations of the system can cause a substantial economic loss of melt and equipment clogging. Further, following a shut-down of the extrusion process, experience shows that a relatively long time is needed following the resumption of the extrusion, until stable thermal and rheologic conditions are reestablished.

Conventionally, it is possible to stop the extrusion process when an irregularity occurs in the work stations downstream of the extrusion station, for example when the extruded melt film is not continuously and uniformly withdrawn from a cooling roller onto which the film is pulled out of the extruder. Such irregularity in the further treatment of the film downstream of the extruder may have many causes. For example, the film can rip in a section the further treatment station downstream of the extruder. Such rips may occur in the zone of the longitudinal stretching or in the cross-stretching zone as well as in the zone where the film is transferred from the last stretching station to a take-up roller. Another problem can, for example, be caused when a film is wound onto the surface of any one of the rollers in the system from which a previous film portion has not been properly removed. Other problems can be caused by a defect in any one of the components of the film production system. Any one of the faults mentioned as examples and other faults cause the operator to stop the extrusion any time when it is no longer possible to maintain a continuous uniform withdrawal or take-up of the melt film by maintaining a uniform take-up or pulling force on the melt film. Stopping the extrusion involves switching off the extruder altogether, which is not desirable for the reasons stated above.

The cooling roller is a critical component in such a film production system because the film as it is withdrawn from the wide slot of the extruder nozzle or sheet die, must loop uniformly around the cooling roller and it must be uniformly withdrawn from the cooling roller to avoid forming wrinkles. As long as the uniform withdrawal of the extruded melt film continues at an adequate withdrawal speed, the extrusion process can continue as well. Under certain circumstances it is even possible to reduce the throughput through the extruder, namely to reduce the quantity of the produced extrudate by slowing down the withdrawal. However, as soon as the required pulling force is no longer uniformly applied to the film as it exits from the extruder nozzle or sheet die, the film will no longer be properly released from the cooling roller, whereby the melt film will be rolled up on the cooling roller which is positively driven. As a result, the extrusion process and the drive of the cooling roller must be stopped.

German Patent Publication DE 3,635,302 C2 (Dietz et al.), published on Apr. 28, 1988, discloses a method and an apparatus for cooling a melt film extruded through a sheet die into a cooling system. The aim of this prior art is to rapidly cool down the melt film downstream of the extruder to low, refrigerating temperatures without causing the melt film to pop off any metal surface of the cooling system, particularly the cooling roller. The problem of a non-uniform withdrawal of the melt film from the nozzle is not addressed by the just mentioned German Patent Publication.

German Patent DE 3,907,036 C1(Wetzel et al.), published on Sept. 13, 1990, discloses a cooling device for thermoplastic synthetic film material. Two rows of guide rollers are mounted in an elongated cooling trough. The spacing between the cooling roller rows can be increased to provide more film storage or decreased to reduce the film storage for film passing from an extruder through the cooling trough.

German patent DE 4,113,746 C1(Puetz et al.), published on Apr. 9, 1992, discloses a winding roller for film or sheet material coming from an extruder. As the diameter of the winding roller increases the pulling force changes. However, it is desirable to withdraw the film or sheet material with a uniform pulling force. For this purpose an electric motor driving the winding roller, is controlled to make sure that the exerted torque takes the increasing winding roller diameter into account.

U.S. Pat. No. 4,609,336 (Stevenson et al.), issued on Sept. 2, 1986, discloses a sheet or film take-up system with a floating roller referred to as "accumulator" positioned between the extrusion die and a take-away conveyor. So-called LVDTs (linear variable differential transformers) are used to measure or sense the thickness of the extruded film which must be kept uniform. The position of the accumulator is controlled for compensating surges in the extrusion.

The above discussed prior art leaves room for improvement with regard to the continued extrusion even if faults should be detected in any of the system stations downstream of the extruder as viewed in the feed advance direction of the film.

OBJECTS OF THE INVENTION

In view of the foregoing it is the aim of the invention to achieve the following objects singly or in combination:

to provide a method and apparatus that will avoid the shut-down of the extruder in a melt film producing system by continuing the withdrawal of the melt film into a detour so that its passage through further treatment stations downstream of the extruder is avoided until the problem is removed;

to perform this detouring of the melt film in response to the sensing of a fault in the system;

to provide a melt film producing system with a detouring roller set for melt film that can withdraw the melt film under fault conditions in the system;

to make sure that the cooling device such as a cooling roller in the system is always maintained free of any rolled-up film portions; and to provide a detouring roller set integrated into the film producing system, wherein the detouring roller set becomes active in response to signals signifying a fault in the film producing system outside the extruder.

SUMMARY OF THE INVENTION

The present method for the continuous withdrawal or take-up of a melt film extruded through a wide slot sheet die or nozzle is practiced in a film extruding system in which the extruded film moves onto a rotatably driven cooling roller operating simultaneously as a withdrawal roller in a cooling station. The film upon leaving the cooling roller may be further cooled, if necessary, until the melt film is hardly stretchable anymore. The withdrawing or take-up velocity corresponds substantially to the extrusion velocity. The extruded and withdrawn film loops partially around at least one rotatably mounted guide roller which is arranged downstream of the cooling roller. Normally, the cooled film is introduced into a roller arrangement or station for further treatment. The present method is practiced when such normal further treatment is temporarily not possible due to a fault in the system. The present method causes the detouring of the extruded film by performing the following steps: detecting a processing fault during the treatment of the melt film, providing a control signal in response to a detected processing fault, and feeding said melt film being withdrawn from said sheet die or nozzle to a roller set arranged downstream of a guide roller while the extrusion process continues, whereby said roller set frictionally engages the melt film in response to the control signal for withdrawing the melt film with a velocity responsive to or adequate to the extrusion velocity to thereby remove the extruded film from further normal treatment until the fault is removed and normal treatment of the film can resume.

According to the invention there is further provided a melt film producing system characterized by a sheet die or nozzle with a wide slot corresponding to a film or sheet width and a cooling station including a cooling roller cooperating with the sheet die, a treatment station, and a detour station between the cooling station and the treatment station. The detour station includes at least one guide roller and a press-on roller rotatably mounted downstream of the cooling station as viewed in a film advance direction. The treatment station includes downstream of the detour station at least one roller arrangement for the further treatment of the melt film. A central controller, such as a central processing unit controls the operation of the system. The guide roller and the press-on roller form a roller set in the detour station, wherein the press-on roller is rotatably and drivably mounted. Additionally, the press-on roller is displaceable toward and away from the guide roller and the press-on roller cooperates with the guide roller in response to a detected control signal signifying a process fault, for example in the roller arrangement of the treatment station. The press-on roller presses the melt film over its width against the guide roller thereby withdrawing the melt film from further treatment while the film extrusion process continues.

A roller set for detouring a melt film according to the invention comprises a support, at least one guide roller rotatably mounted to said support, a press-on roller and a mounting on which said press-on roller is mounted for rotation and for displacement toward and away from said guide roller, a first drive connected to said press-on roller for rotating said press-on roller and a second drive member connected to said mounting for displacing said press-on roller relative to said guide roller between a rest position and a working position of said press-on roller, whereby the press-on roller in its working position cooperates with the at least one guide roller in detouring the film.

According to the invention, the guide roller cooperates with the positively driven press-on roller for the detouring, but the guide roller of the detouring roller set guides the film at all times. For this purpose the guide roller and the press-on roller are arranged in the path of the melt film downstream of the cooling roller as viewed in the feed advance direction of the film. The press-on roller has preferably a rubber or elastomeric jacket which presses the film against the guide roller outer surface that is preferably chromium plated. The press-on roller is positively rotated when it contacts the guide roller so that its rubberized outer surface applies a sufficient pulling force to the melt film for releasing the melt film from the cooling roller. Normally, the press-on roller is maintained in a rest position. However, when a fault is detected, the press-on roller drive is activated for rotation and for contacting the guide roller. Preferably two drives are provided, one drive for rotating the press-on roller with an r.p.m. adequate for the continued film withdrawal and another drive for displacing the press-on roller against the drive roller with an adequate press-on force. The press-on roller is only advanced toward and pressed against the guide roller in response to a detected fault signal that also causes the positive rotating of the press-on roller. Since, under normal operating conditions the press-on roller does not contact the guide roller, adverse influences of the pressure roller onto the film are avoided when the system works normally. Any pressure contact on the film under normal operating conditions could cause frictional wear and tear and surface damages to the film.

Advancing the press-on roller toward the guide roller or away from the guide roller can be accomplished either by a linear guide movement or by a tilting movement with the help of the above mentioned other drive which is a displacement drive such as a piston cylinder device that may be operated hydraulically or pneumatically or it may be a mechanic drive for example a motor and a gear. In all embodiments it is necessary to generate a sufficient press-on force in order to produce the required surface pressure on the contact surface between the press-on roller and the guide roller for engaging the film by sufficient friction to apply the necessary pulling force for detouring the film.

The guide roller and the press-on roller form together a roller set which is easily retrofitted into an existing film or sheet producing system, whereby a guide roller of the system may be used for cooperation with the detouring roller set, for example in connection with conventional film thickness measuring devices including guide rollers mounted in respective support stands. However, the detouring roller set according to the invention may also be used as a completely independent device that includes, for example an integrated tension force measuring or sensing member. In the latter instance the roller set will not be retrofitted into an existing film producing system, rather it will become part of a newly constructed system.

The detouring roller set according to the invention is controlled in a closed loop and open loop manner by the control of the entire system including a CPU which receives detected signals and operator signals produced as inputs on a keyboard.

The type of fault that is sensed or detected for activating the detouring roller set will primarily involve the following faults or inputs:

(a) a rip or tear in the film as it is being produced;
(b) a change or disappearance of a normal pulling force on
    a floating roller or the absence of a press-on force or tension force as measured by a respective compression or tension load cell positioned in any one of the components of the system downstream of the cooling roller;

(c) an action by an operator for example by a manual input through a keyboard for detouring a film for any reason; and (d) a diminishing drive current in the electric drive motor of the cooling roller.

The detection of any one of the above system conditions will produce a control signal that will first accelerate the press-on roller to the system r.p.m. and then contact the press-on roller against the guide roller so that both rollers will rotate with the system r.p.m. at the time of contact. As a result, a frictional pulling force is applied to the film between the press-on roller and the guide roller. The positive drive of the press-on roller can, for example be accomplished by a torque moment controller so that the pulling force exerted on the film is constant at all times when the press-on roller is in a working position.

An overriding clutch installed in the drive train of the press-on roller makes sure that an excess tension force is avoided when the normal pulling force becomes effective again in the system components downstream of the press-on roller. Such an overriding clutch makes sure that the normal pulling force exerted by the system components arranged downstream of the detouring roller set according to the invention, always has priority over the pulling force exerted by the press-on roller and guide roller.

The drive motor for the press-on roller can either be mounted directly to the shaft of the press-on roller, or the driving force may be transmitted to the press-on roller through a belt and pulley drive. One pulley of such a belt and pulley drive is positioned either in the tilting journal of the press-on roller or it may be rotatably mounted in the machine frame, whereby in both instances the required torque moment is applied to the press-on roller.

It is preferred and suitable to arrange an emergency take-up roller downstream of the detouring roller set for rolling up film while the treatment station is not operating. Instead of an emergency take-up roller it is possible to directly feed the melt film into a cutting mill to thereby assure the proper disposal of the film produced during the standstill of the system except for the continued operation of the extruder.

It is an advantage of the invention that switching off the extruder becomes unnecessary when system faults occur. This feature makes sure that a warm up operation of the extruder is avoided and the normal film production can be resumed immediately upon removal of the system fault downstream of the sheet nozzle or die.

BRIEF DESCRIPTION OF THE DRAWINGS

In order that the invention may be clearly understood, it will now be described, by way of example, with reference to the drawings, wherein.

DETAILED DESCRIPTION OF PREFERRED EXAMPLE EMBODIMENTS AND OF THE BEST MODE OF THE INVENTION

Figure 1:
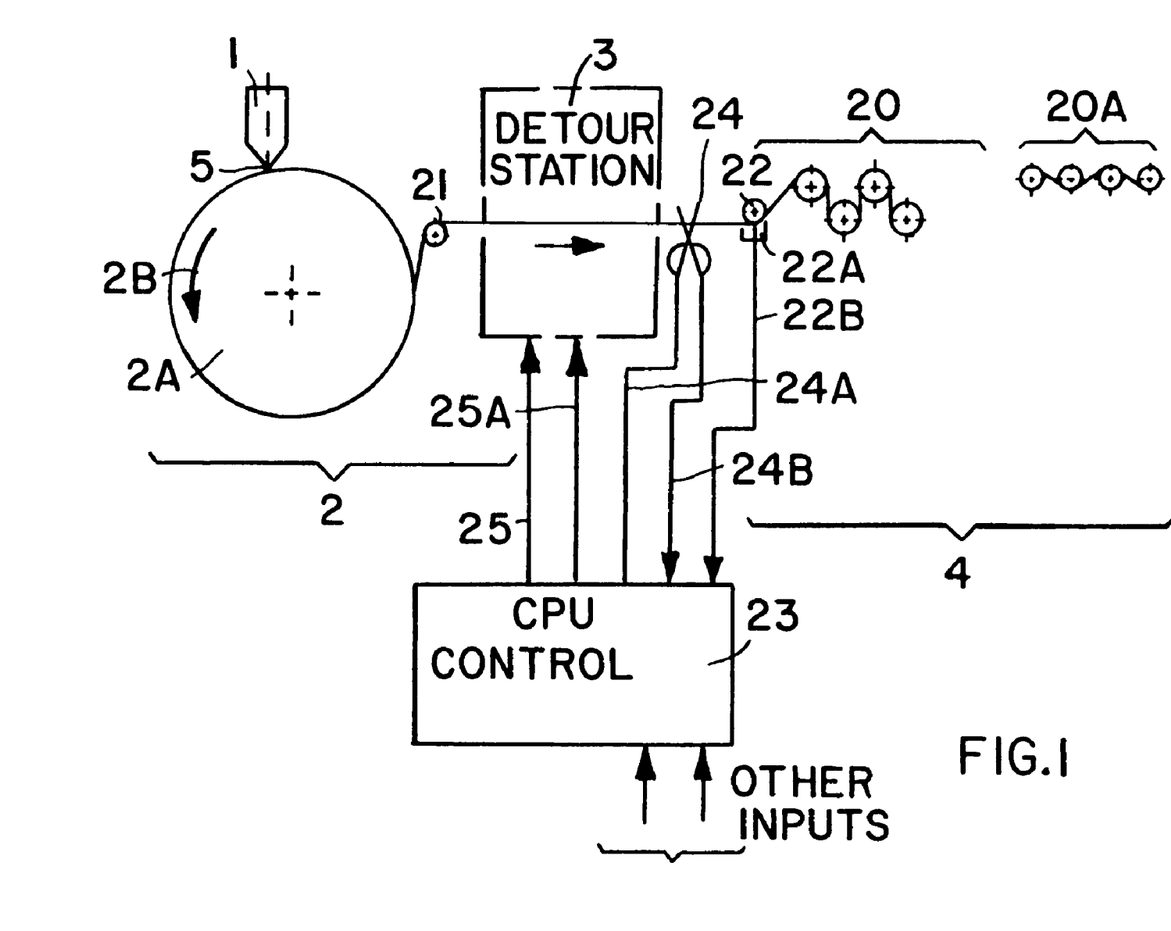
FIG. 1 is a schematic side view of a sheet or film producing system with a detouring roller set according to the invention.

FIG. 1 shows a film or sheet producing system for polyester film. The system includes a sheet die or nozzle 1 and three system stations 2, 3 and 4. The first station 2 is a cooling station including a cooling roller 2A rotating counterclockwise as indicated by the arrow 2B. The sheet die 1 discharges the melt film or sheet 5 onto the cooling roller 2A. A pull-out roller 21 is positioned downstream of the cooling roller 2A. The pull-out roller 21 feeds the cooled film or sheet into a second detouring station 3 according to the invention which will be described in more detail below with reference to FIGS. 3 and 4. Under normal operating conditions only a guide roller or rollers of the detouring station 3 are effective. However, the station 3 becomes effective in response to a system fault as described below. Downstream of the detouring station 3 there is arranged a third treatment station 4 for the further treatment of the film under normal operating conditions. Such further treatment involves, for example, a film stretching operation.

The just described system operates as follows. The sheet die or nozzle 1 has a width perpendicularly to the plane of the drawing corresponding to the width of the sheet or melt film 5 to be produced and the nozzle 1 extrudes that film with the required width onto the surface of the cooling roller 2A.

The cooling roller 2A is driven by a drive including a motor not shown. The drive may include a belt and pulley drive or the motor may be directly connected to or integrated into the shaft of the roller 2A.

Once the film 5 has been completely cooled, it travels over the take-out roller 21 that releases the film 5 from the surface of the cooling roller 2A and causes the film to travel through the detouring station 3 and onto a guide or sensor roller 22 which is conventionally equipped with at least one force measuring member or detector such as a load cell 22A. The roller 22 guides the film 5 onto a roller arrangement including heating rollers 20 and stretching rollers 20A forming the treatment station 4A. The treatment in the station-4 results for example in a polyester thin film.

If the load cell 22A that forms part of the guide roller 22 or is integrated therein, detects a pulling force that does not correspond to a required or defined pulling force necessary for uniformly and continuously extracting the film 5 from the cooling roller 2A, then the respective signal signifies a fault in the system station 4. The respective signal is then transmitted through a control conductor 22B to a central processing unit 23 (CPU) or controller that compares the measured signal with a rated signal stored in a memory of the CPU to determine a fault signal and to generate a respective control signal. A cutter 24 positioned upstream of the roller 22 as viewed in the feed advance direction of the film from left to right in FIG. 1, is activated in response to the control signal to sever the film and to simultaneously activate a press-on roller 3B shown in FIGS. 3 or 4, whereby the leading end of the melt film 5 is seized and pressed against a guide roller 3A for detouring the film until the fault in the system station 4 has been removed. The cutter 24 receives its control signal through a conductor 24A from the CPU 23. Once the severing of the film 4 by the cutter 24 is completed, a respective signal is returned through conductor 24B to the CPU 23. When the severing is completed, the detour station 3 is activated through control conductors 25 and 25A to activate drive motors 18 and 19 for the rotating and tilting respectively, of the press-on roller 3B. The press-on roller 3B presses the film 5 against the guide roller 3C in FIGS. 3 or 4. The required press-on pressure is maintained by the press-on roller 3B until a fault has been removed. According to the invention, the extrusion process can continue with a required or adequate velocity for the film withdrawal from the cooling roller 2A. The film so withdrawn can be moved to a different use while the further treatment station 4 is being repaired. The different use of the film may, for example involve shredding in a shredder not shown.

Figure 2:
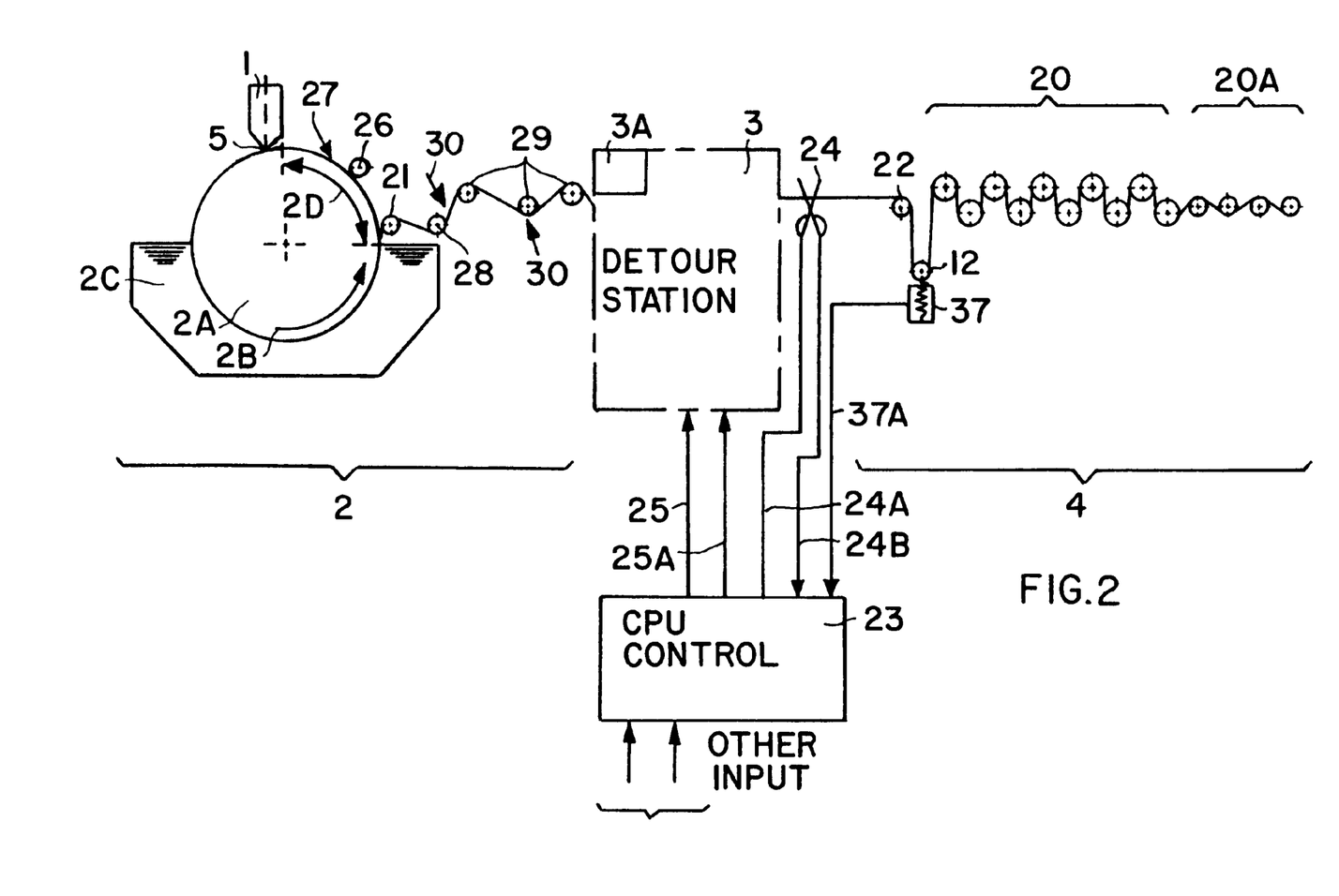
FIG. 2 is a view similar to that of FIG. 1, but illustrates additionally a water cooling bath arranged upstream and a pulling force sensor downstream of the detouring roller set.

FIG. 2 shows schematically the basic features of a system for producing polypropylene film. Construction details not part of the invention may vary, depending on the machine type. As in FIG. 1, the film 5 is extruded by a nozzle or sheet die 1 having a wide slot, onto the cooling roller 2A rotating through a cooling bath 2C. The roller 2A is driven in the counterclockwise direction 2B. The cooling roller 2A is filled with cooling water and travels through the bath 2C also filled with cooling water so that the film 5 is cooled simultaneously on both of its surfaces or sides.

Referring further to FIG. 2, once the film 5 has completely solidified, the guide or take-up roller 21 separates the film 5 from the cooling roller 2A and transports the film for further treatment in station 4. The roller 21 is preferably positively driven. As shown in FIG. 2, the film 5 loops around the roller 2A for about 270° while a sector 2D of about 90° is free of any film. This sector 2D is used to completely dry and clean the surface of the cooling roller 2A of any water prior to extruding film 5 onto the surface of the roller 2A. When the surface of the roller 2A reaches the extrusion line under the nozzle 1, the roller surface is dry again. Such cleaning and drying is accomplished by a roller 26 having a rubberized surface and functioning similar to a doctor blade or squeegee. Further, air nozzles 27 are arranged downstream of the drying roller 26 as viewed in the counterclockwise rotation direction of the roller 2A. Thus, the surface of the roller 2A in the zone 2D is completely dried even before this zone reaches the nozzle 1 as the roller keeps rotating.

Depending on the position of the roller 21 relative to the water level in the bath 2B, it is possible to immerse the melt film 5 that has been separated from the cooling roller 2A into the water in the bath 2B to achieve additional cooling.

Once the film 5 has left the water bath 2B, it is moved over a guide roller 28 and a roller system 29 having rollers that are exposed to blowing air from so-called "air knives" 30 which are nozzles that blow drying air onto the film 5 on opposite surfaces thereof to remove any water from the film. The cooling station 2 of the system can also include a film thickness measuring device or such a device may be positioned between the stations 2 and 3. Such a thickness measurement device would include a guide roller and a conventional thickness measuring gage such as an LVDT (linear variable differential transformer). Under normal operating conditions the film that has passed through the thickness measuring device will be moved through a stretching operation particularly a longitudinal stretching. However, in connection with polypropylene, the number of heating rollers 20 will be increased as compared to the number of rollers in a polyester stretching station. In any event, the detouring station 3 and the cutting mechanism 24 are the same in FIGS. 1 and 2, whereby the detouring station 3 and the cutter 24 are operated as described above with reference to FIG. 1.

The system of FIG. 2 has the advantage that the thickness measurement device can be incorporated into the roller set of the detouring station 3 as shown symbolically at 3A. More specifically, one of the guide rollers of the thickness measuring device can double as a guide roller that cooperates with the press-roller 35. For example, in FIG. 3 the guide roller 3C could cooperate with the thickness measuring device and with the press-on roller 3C. In FIG. 4 the guide roller 3A could cooperate with such e thickness measuring device, for example.

The sensor or detector for detecting a defined process fault in FIG. 2 does not comprise a force measuring load cell cooperating with the guide roller 22. Rather, in FIG. 2 the displacement measuring device or sensor 37 cooperates with a floating roller 12, whereby the motion of the floating roller 12 no vertically up and down is sensed by the sensor 37 such as ail LVDT and transmitted through a control conductor 37B to the CPU 23. Since the melt film 5 travels in contact with the floating roller 12, the instantaneous position of the floating roller 12 is a measure of the tension in the film 5, whereby any defined process fault can be detected when that film tension changes, for example due to a rip in the film 5. The control conductor 37B then provides a respective signal to the CPU 23 which in turn activates the control conductors 25 and 25A for energizing the drives 18 and 19 for the press-on roller 313 of the detouring station 3.

Figure 3:
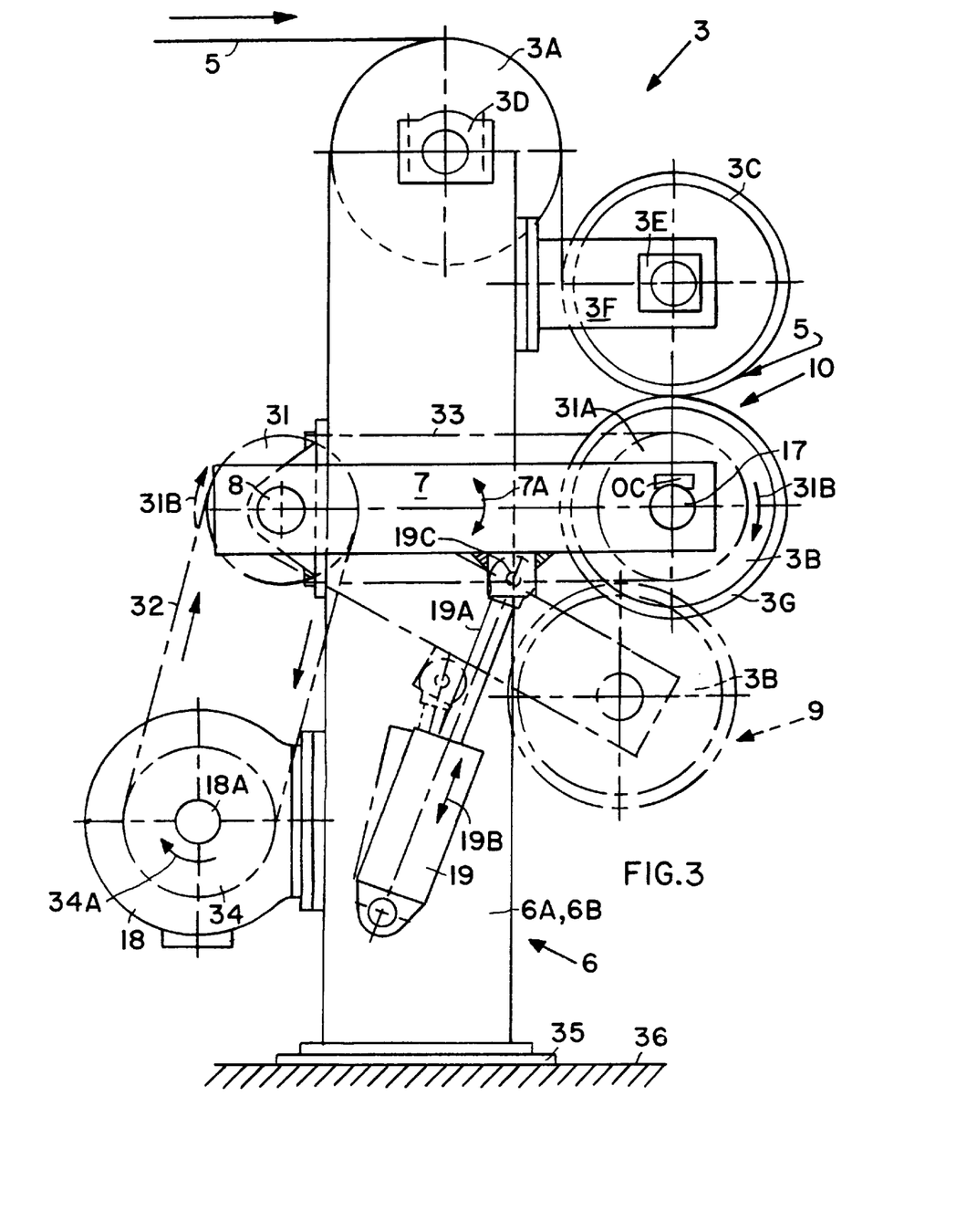
FIG. 3 illustrates the details of a detouring roller set according to the invention for use in the systems of FIG. 1 or 2.
Figure 4:
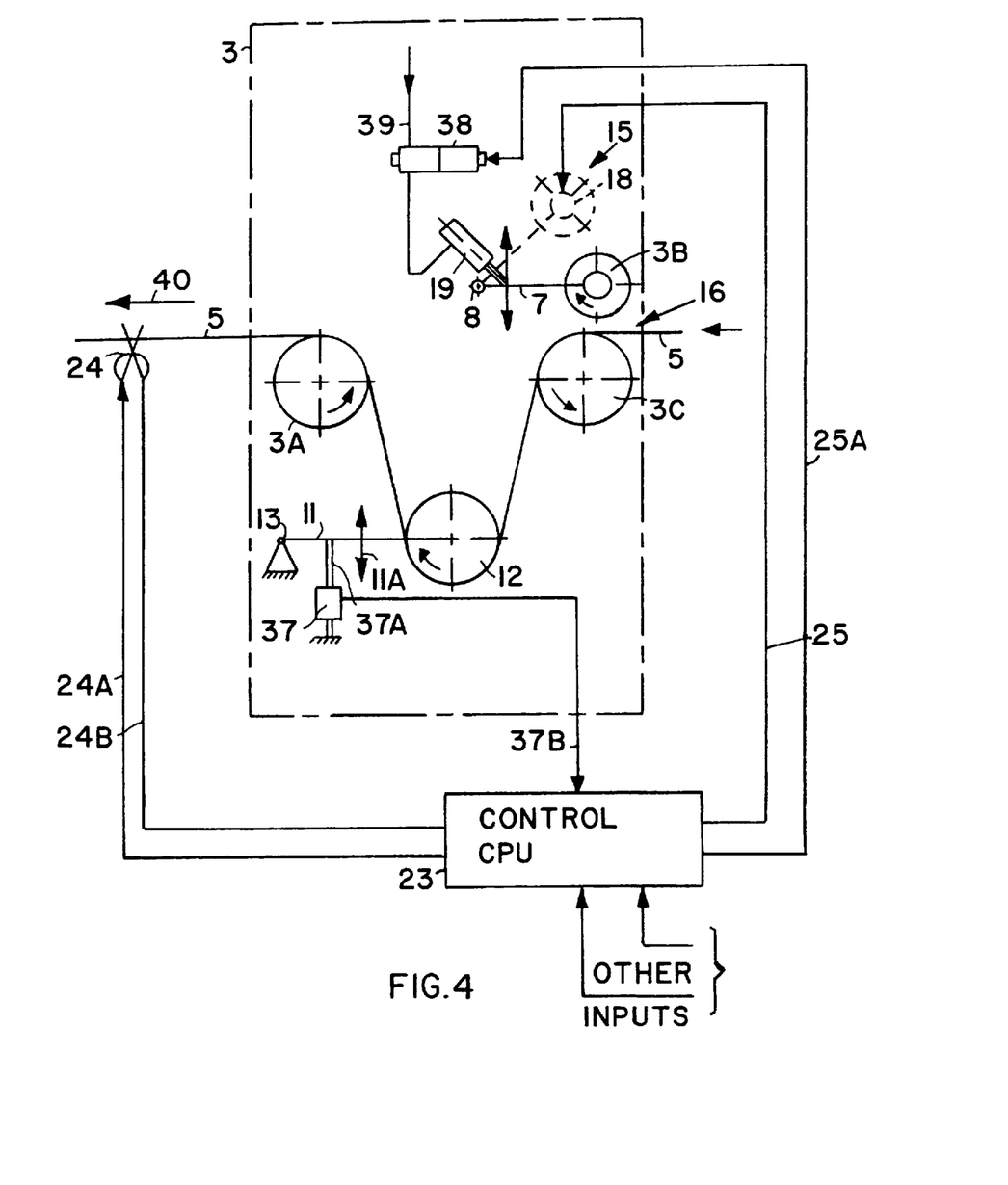
FIG. 4 illustrates a modified detouring roller set with a tension sensor according to the invention for use in any one of the systems of FIGS. 1 or 2, whereby the tension sensor shown in FIG. 2 may be omitted.

FIG. 3 illustrates embodiment of a detouring station 3. The cooled solidified film 5 travels over a first guide roller 3A which is constructed as a light or easy running roller. For that purpose the roller 3A is mounted in roller bearings 3D secured to a support 6 having two brackets 6A, 6B for example, mounted through a base 35 to a floor 36. A second guide roller 3C is arranged downstream of the first guide roller 3A. The second guide roller 3C is preferably also mounted by roller bearings 3E for an easy rotation. The roller 3C is preferably secured to a mounting 3F which in turn is secured to the support 6. Thus, both guide rollers 3A and 3C are supported by the brackets 6A and 6B forming the support 6. A press-on roller 3B with a rubberized outer jacket 3G is rotatably mounted by a journal shaft 17 to a free end of a tilting lever 7. The other end of the tilting lever 7 is tiltably secured to an axle or journal pin 8 also mounted to the support 6. A motor 18 provides a first rotational drive for the press-on roller 3B. A pulley 34 rigidly mounted to the motor shaft 18A drives the press-on roller 3B through belts 32, 33 running over further pulleys 31 and 31A. The pulley 31 is a double pulley to accommodate both belts 32 and 33. The arrow 34A indicates the clockwise rotation of the pulley 34. Arrows 31B indicate the clockwise rotation of the pulleys 31 and 31A. The belts 32 and 33 can be flat belts, V-belts, or gear belts.

A tilting motion of the tilting lever 7 about the journal pin 8 is indicated by a double arrow 7A and is caused by a second drive 19 in the form of a piston cylinder device that can move its piston rod 19A up and down as indicated by the arrow 19B. The upper end of the piston rod 19A is journal led by a journal 19C to the tilting lever 7. In the shown full line position 10, the press-on roller 3B is in its working position in press-on contact with the guide roller 3C whereby the film is detoured to a different use in response to an abnormal working condition signal from the controller or CPU 23. The dashed line position 9 shows the rest position of the roller 3B. By operating the piston cylinder device 19, the tilting lever 7 can be brought into the working position 10 or back into the rest position 9 and vice versa. In the rest position 9 of the press-on roller 3B the film 5 is still guided by the guide roller 3C but without the influence of the press-on roller 3B.

Preferably, an override clutch OC is arranged between the shaft 17 and the pulley 31A carried by the press-on roller 3B so that in case the drives of the rollers 20, 20A in the treatment station 4 are positively driven again, the detouring through the roller set in the station 3 is automatically switched off when these rollers 20, 20A apply withdrawing tension again to the film 5.

FIG. 4 shows an embodiment of a roller set in a detouring station 3 which includes a floating roller 12 arranged between a pair of guide rollers 3A and 3C positioned with their axles in parallel to one another and sufficiently spaced from each other to permit an up and down movement of the floating roller 12. The press-on roller 3B cooperates with the guide roller 3C. When a fault has been detected the press-on roller 3B is caused to contact the guide roller 3C in a working position 16, whereby the film 5 is detoured so as not to enter the station 4. Under normal operating conditions the press-on roller 3B is in a rest position 15 and the film 5 is transported into the treatment station 4 positioned to the left of the cutter 24. The film 5 will be detoured when the press-on roller 3B assumes the working position 16.

Rather than placing the force measuring load cell 22A inside the guide roller 22, as mentioned above with reference to FIG. 1, or placing the force measuring device 37 downstream of the guide roller 22 as shown in FIG. 2, the force measuring device or sensor 37 in FIG. 4 is integrated into the detouring station 3. The floating roller 12 in FIG. 4 is secured in a rotatable manner to the free end of a lever arm 11. The other end of the lever arm 11 is journalled to a fixed point 13 for an up and down tilting movement of the floating roller 12 as indicated by the arrow 11A. The film 5 loops around the floating roller 12, whereby the floating roller 12 can transmit the film tension to the sensor 37. For this purpose the lever 11 is secured to a sensor pin 37A of the sensor 37 which is stationary but senses the up and down movement of the sensor pin 37A. The respective signal is transmitted through a conductor 37B to the CPU 23. The CPU 23 is further connected through the conductors 24A and 24B to the cutter 24. The drive motor 18 for rotating the press-on roller 3B is integrated into the press-on roller 3B and is controlled by the CPU 23 through a conductor 25. A further conductor 25A connects a magnetically controlled valve 38 to the CPU 23 for operating the tilting or displacement drive 19 that tilts the lever arm 7 about the journal shaft 8 up and down between the working position 16 in which the press-on roller 3B contacts the guide roller 3C or the rest position 15 in which the press-on roller 3B does not contact the guide roller 3C. The operation of the detouring station 3 shown in FIG. 4 in combination with the floating roller 12 and pulling force sensor 37 is substantially the same as in FIG. 1 and the same as in FIG. 2, as far as the pulling force measurement and the respective control of the press-on roller 3B are concerned. The magnetically controlled valve is connected through a pressure hose 39 or the like to a source of fluid under pressure not shown. In FIG. 4 the film 5 moves from right-to-left as indicated by the arrow 40.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. film producing system comprising a film extruding nozzle (1) for producing said film out of a melt, said nozzle having a wide slot corresponding to a film width to be produced, said system further comprising a cooling station (2) including a cooling roller (2A) rotatably mounted downstream of said nozzle (1) as viewed in a film advance direction from said nozzle to said cooling station, and further including downstream of said cooling station (2) at least one film treatment station (4) for the treatment of extruded melt film, a detouring station (3) positioned downstream of said cooling roller (2A) and upstream of said at least one film treatment station (4) for passing film to said treatment station under normal operating conditions, said detouring station (3) comprising a support (6), a roller set comprising at least one first guide roller (3C) rotatably mounted to said support (6), a mounting (7) in said detouring station (3), a press-on roller (3B) mounted for rotation on said mounting (7) and for displacement toward and away from said guide roller (3C), a first drive (18) connected to said press-on roller (3B) for rotating said press-on roller and a second drive (19) connected to said mounting (7) for displacing said press-on roller (3B) relative to said guide roller (3C) between a press-on roller rest position away from said guide roller under said normal operating conditions and a press-on roller working position in contact with said guide roller (3C), and a controller (23) for controlling said system so that said press-on roller in said press-on roller working position causes said film to be detoured in response to an abnormal working condition signal from said controller (23).

2. The system of claim 1, wherein said press-on roller (3B) comprises an override clutch (OC) cooperating with a roller axis or shaft (17) of said press-on roller (3B) for disengaging said first drive (18) in response to an override signal.

3. The system of claim 1, wherein said first drive (18) for rotating said press-on roller (3B) is an electric motor integrated into a shaft of said press-on roller.

4. The system of claim 1, wherein said first drive (18) is an electric motor (18) mounted separately from said press-on roller (3B), and wherein said first drive further comprises a drive transmission (34, 32, 31, 33, 31A) interposed between said electric motor (18) and said press-on roller (3B).

5. The system of claim 1, wherein said press-on roller (3B) comprises a rubber jacket (3G).

6. The system of claim 1, wherein second drive (19) for displacing said press-on roller (3B) linearly or rotatably comprises a piston cylinder device (19A, 19B) for adjusting said press-on roller (3B) toward or away from said guide roller (3C).

7. The system of claim 1, further comprising a second guide roller (3A) also mounted to said support (6) in a position vertically above and laterally displaced from said at least one first guide roller (3C), said press-on roller (3B) cooperating with at least one of said first and second guide rollers (3C, 3A).

8. The system of claim 1, further comprising a second guide roller (3A) horizontally spaced from said at least one first guide roller (3C), a floating roller (12) positioned between said first and second guide rollers, a displacement sensor (37) positioned for cooperation with said floating roller (12), and an electrical conductor connecting said displacement sensor (37) to said controller (23) for producing a control signal or signals.

9. The system of claim 1, further comprising film cleaning and drying elements (29, 30) positioned downstream of said cooling roller (2A), and wherein said detouring station (3) is positioned downstream of said cleaning and drying elements (29, 30).

10. A method for producing a film using said film producing system of claim 1, comprising the following steps:

(a) extruding a melt from said nozzle (1);

(b) cooling said melt to form a film by said cooling station (2);

(c) feeding said film from said cooling station (2) to said at least one film treatment station (4) to treat said film under normal operating conditions;

(d) detecting a processing fault during the treatment of the film;

(e) generating a control signal by said controller (23) in response to a detected processing fault; and (f) detouring said film in response to said control signal in said detouring station (3) whereby extrusion continues and extruded film is detoured from said treatment station.

11. The method of claim 10, wherein said detouring step comprises the following substeps:

(d1) rotating said press-on roller (3B) in said detouring station at a speed adequate for a continued film withdrawal from said cooling station (2);

(d2) pressing said press-on roller (3B) against said at least one first guide roller (3C) contacted by said film (5); and (d3) diverting said film from its normal path at a withdrawal film speed adequate to sustain film withdrawal from said-cooling station (2A).

12. The method of claim 10, wherein said detecting of said processing fault includes supplying a detected signal to said control unit (23), converting said detected signal into a respective control signal, and controlling said detouring with said control signal or signals.

13. The method of claim 10, wherein said detecting provides an electrical signal representing an abnormal pulling force applied to said melt film, and wherein said abnormal pulling force is outside a permissible range of pulling forces.

14. The method of claim 13, comprising detecting said pulling force by at least one load cell (22A).

15. The method of claim 13, comprising measuring said pulling force by a displacement sensor (37).

16. The method of claim 10, further comprising automatically severing said melt film downstream of said detouring step in response to said electric signal.

17. The method of claim 10, comprising pressing, in response to said control signal, said film against said at least one first guide roller, pulling said film off said cooling roller, and detouring said film from said treatment station.

* * * * *

UNITED STATES PATENT AND TRADEMARK OFFICE
CERTIFICATE OF CORRECTION

PATENT NO. : 6,042,762

DATED : Mar. 28, 2000

INVENTOR(S) : RUTZ et al.

It is certified that error appears in the above-identified patent and that said Letters Patent is hereby corrected as shown below:

| | | |
|---|---|---|
| Col. 1, | line 42, | after "section" insert --of--. |
| Col. 8, | line 4, | after "press-roller", replace "35" by --3B--; |
| | line 7, | afer "such", replace "e" by --a--; |
| | line 14, | after "12", delete "no"; |
| | line 15, | after "as", replace "ail" by --an--; |
| | line 25, | after "illustrates", insert --one--; |
| | line 53, | after "is", replace "journal" by --journalled--; |
| | line 54, | before "by", delete "led--; |
| Col. 9, | line 63, | before "film", insert --A--. |

Signed and Sealed this

Thirteenth Day of February, 2001

Attest:

NICHOLAS P. GODICI

*Attesting Officer*   *Acting Director of the United States Patent and Trademark Office*